Patented May 6, 1930

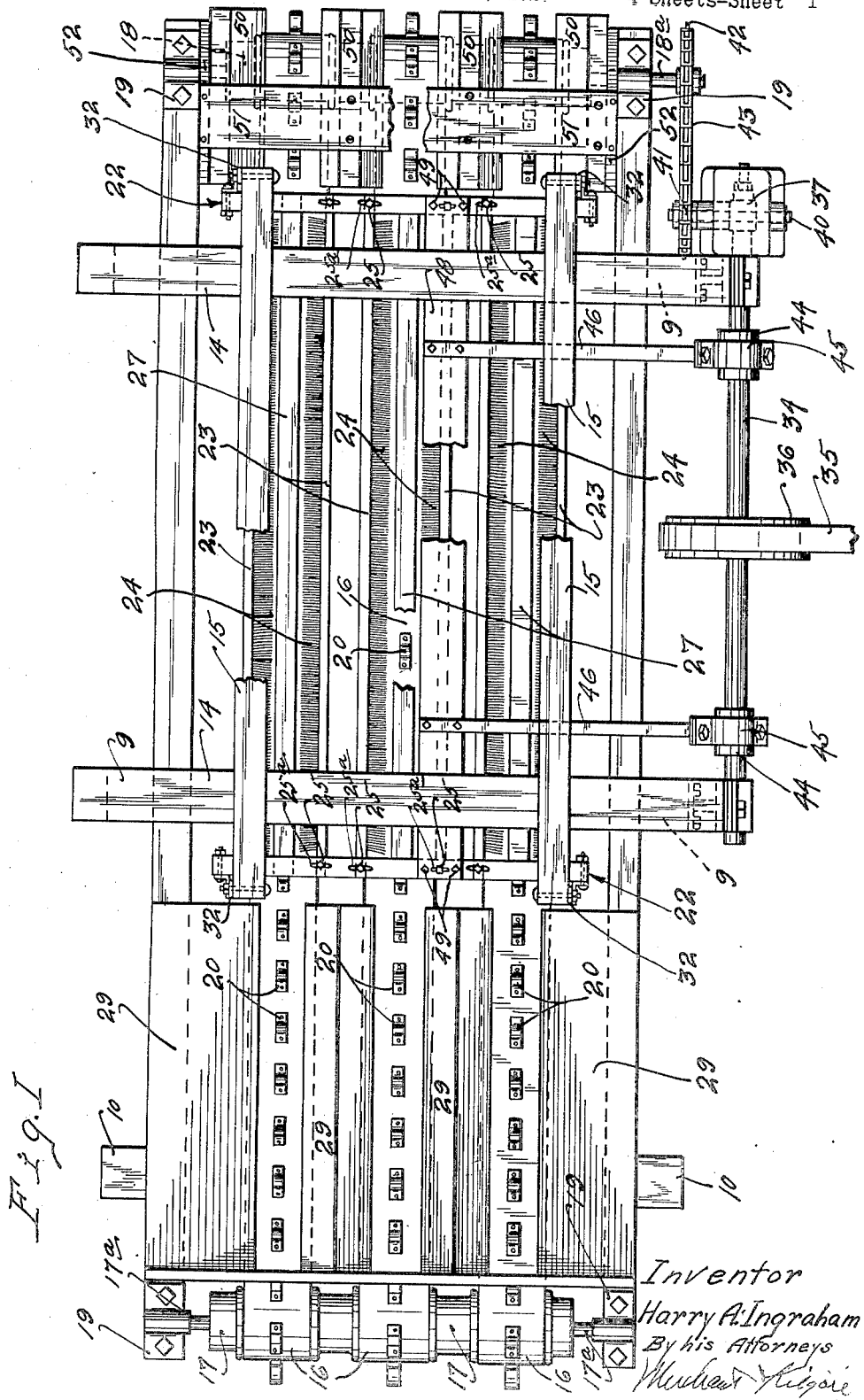

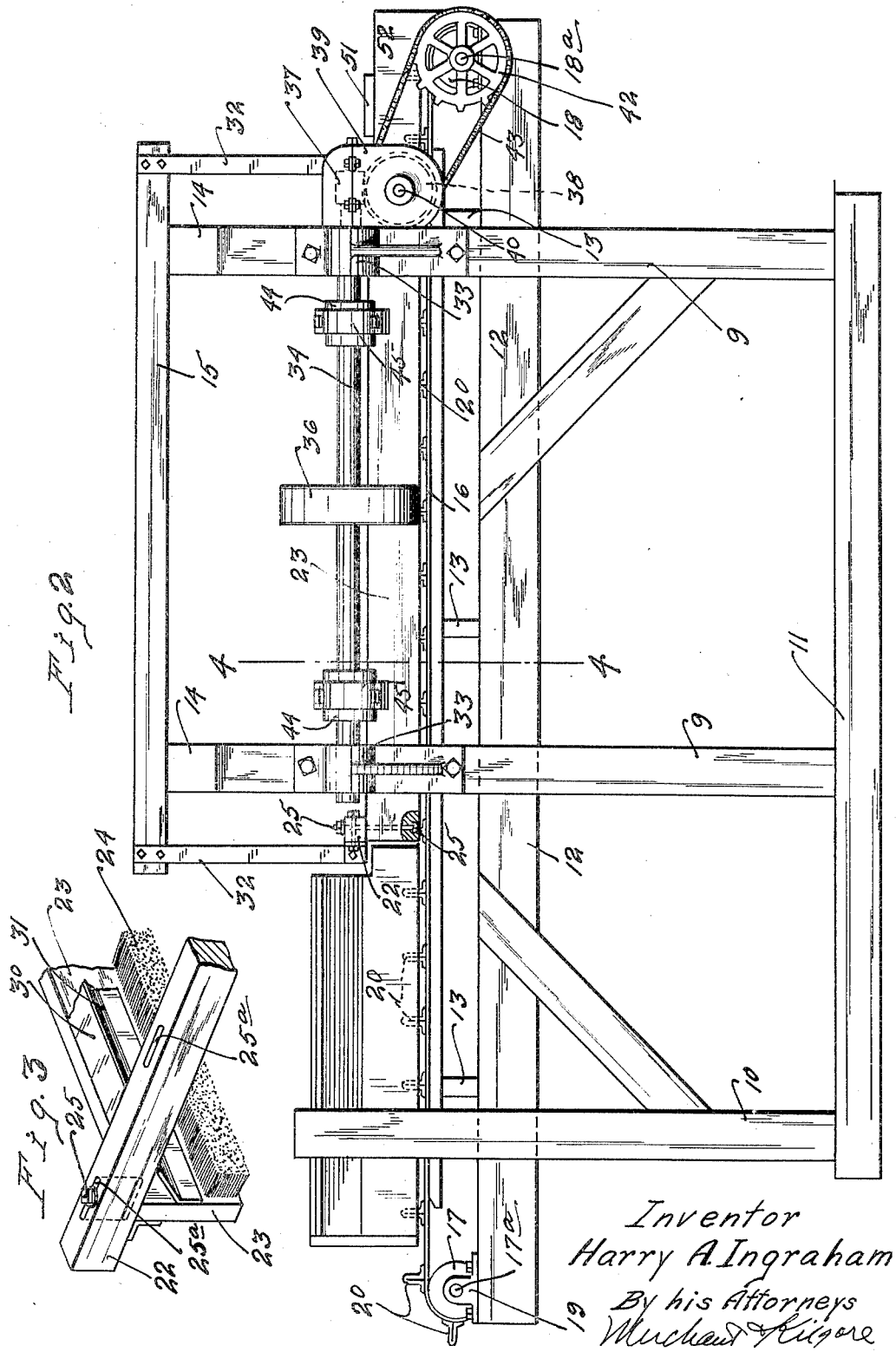

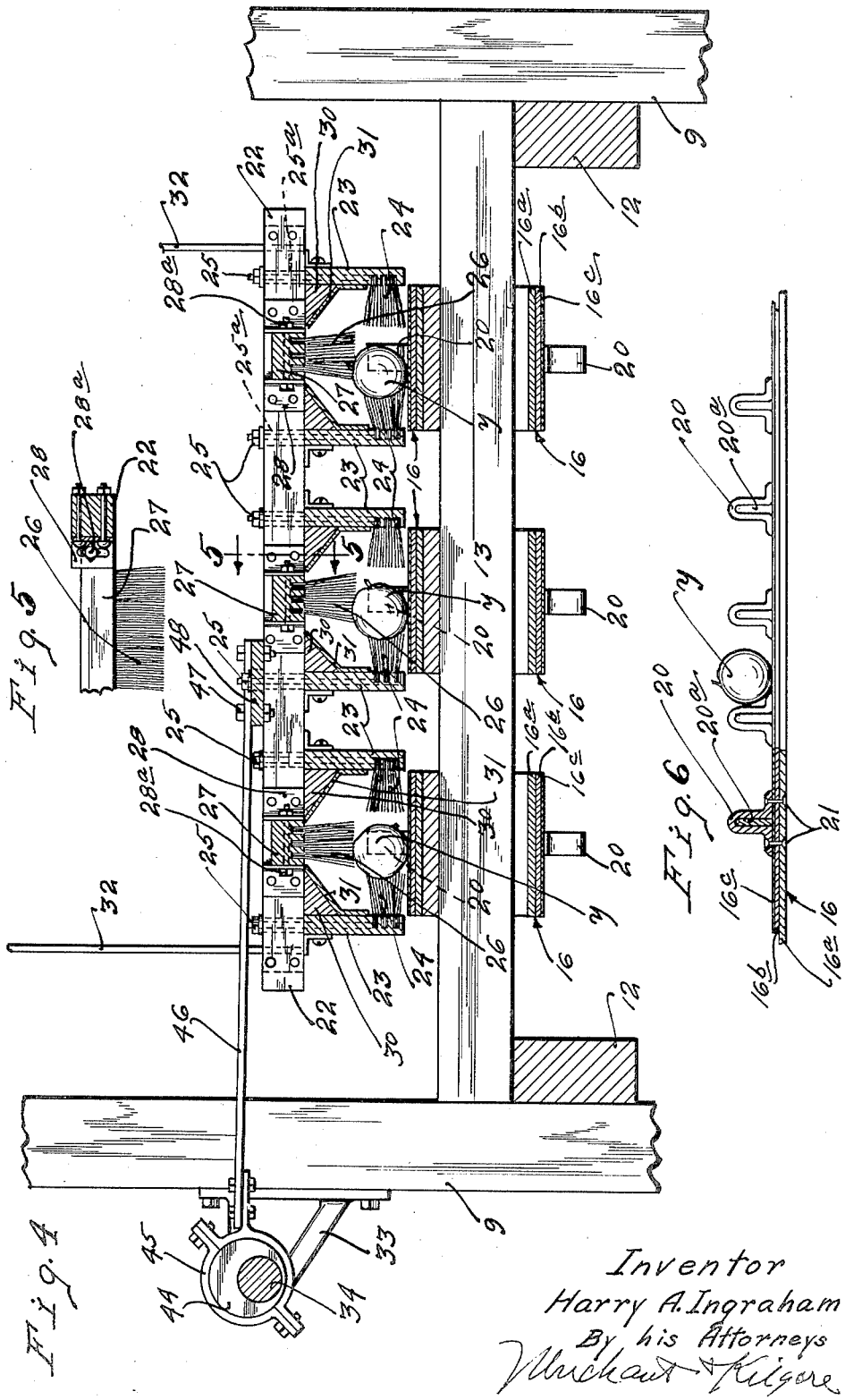

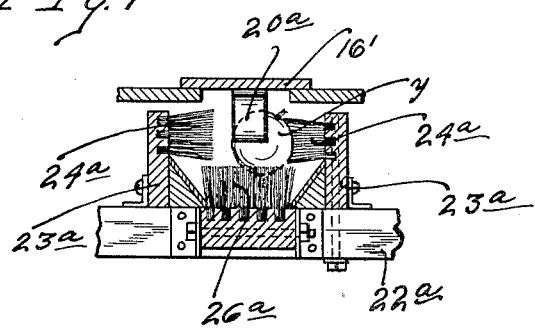
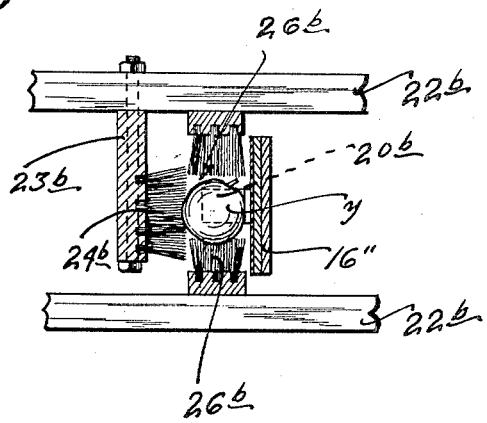

1,757,308

UNITED STATES PATENT OFFICE

HARRY A. INGRAHAM, OF ZILLAH, WASHINGTON

FRUIT CLEANER

Application filed January 19, 1927. Serial No. 162,023.

This invention provides a simple and highly efficient machine for removing from fruit dust or like deposits resulting from spraying with Bordeaux mixture, arsenate of lead, or other insect or fungus-destroying liquids. Most of the deposits left from spraying of apples or other fruit are poisonous and all thereof are objectionable and must be removed from the apples if they are to be disposed of to best advantage. In fact, some foreign countries have passed laws preventing importation of American apples on which the spraying deposits have not been removed. It is a difficult matter to remove these spray deposits from apples, for example, without bruising or damaging the apples, and it is especially difficult to remove the deposits from the calyxes or indentations thereof.

By the machine of the present invention, the spray deposits can be effectually removed from all of the exterior surfaces of apples without in any way bruising or damaging the fruit. The removal of the so-called dust deposits from the apples or other fruit is accomplished by projecting the fruit against the endwise-presented bristles of brushes, or vice versa. The brushes are arranged to afford a runway or passage through which the apples or fruit are progressively moved; and, as a highly important feature, the apples are positively held spaced and out of contact while they are being subjected to the brushing action by pliable spacing devices that are arranged to move with the apples as they are progressively fed through the runway, and are being subjected to the brushing action.

The invention may take various forms and, in the accompanying drawings not only what is thought to be the preferred form thereof but several modifications are indicated.

Referring to these drawings, wherein like characters indicate like parts throughout the several views:

Fig. 1 is a plan view illustrating the preferred form of the machine, some parts being broken away;

Fig. 2 is a side elevation of the machine;

Fig. 3 is a fragmentary perspective showing a part of one of the brushes and a part of the vibratory frame to which it is secured;

Fig. 4 is an enlarged transverse section taken on the line 4—4 of Fig. 2, some parts being broken away;

Fig. 5 is a fragmentary section taken on the line 5—5 of Fig. 4, some parts being removed;

Fig. 6 is a detail showing a portion of one of the feed belts, some parts of said belt being in vertical section;

Fig. 7 is a fragmentary transverse vertical section illustrating a modification in the arrangement of the brushes and feed belt; and Fig. 8 is a view corresponding to Fig. 7, but illustrating a still further modified structure.

Describing first the preferred form of the machine illustrated in Figs. 1 to 6, inclusive, attention is first called to the fact that all of the parts of the machine are supported directly or indirectly from a suitable framework, which, as shown, comprises upright posts 9 and 10, base tumblers 11, approximately horizontal longitudinal beams 12 and cross-ties 13. The posts 9, of which, as shown, there are 4, extend upward above the posts 10 and support a rectangular overhead framework made up, as shown, of cross beams 14 and longitudinal beams 15.

Here, attention is called to the fact that in this so-called preferred form of the machine, the runway-forming elements are arranged in triplicate, but that it should be understood that any desired number of these runways, to wit: one or more, may be employed. Hence, in this triplicate machine, instead of using a single wide belt for all three of the runways, it is preferred to employ three feed belts 16, to wit: one for each runway. These feed belts 16 are arranged to run over a front roller 17 and a rear roller 18, the shafts 17ª and 18ª, respectively, of which are journaled in suitable bearings 19 on the ends of the horizontal beams 12. It will be further noted that, as preferably arranged, the rollers 17 and 18 are flanged so that they guide the belts 16 and hold the same against lateral displacement. The belts 16 may take various forms, but, in this preferred arrangement, each belt comprises a leather belt section 16ª, a felt belt section 16ᵇ and a canvas section 16ᶜ, which parts are connected as a single belt with the canvas 16ᶜ covering the felt 16ᵇ and with the felt 16ᵇ interposed between the leather belt 16ª and said canvas covering. On the exterior surface of each belt are pliable longitudinally spaced fruit-spacing cleats or lugs 20. These cleats or lugs 20, as preferably designed, are each formed by a U-shaped fold of heavy felt placed over a stiffening core 20ª that may be of stiff felt or even stiffer material. The edges of the U-shaped folds of these cleats are outturned and secured to the belt by small rivets 21 or the like, (see particularly Fig. 6). By reference to Figs. 1 and 2, it will be noted that the cleats or lugs 20 are very much narrower than the belts 16 and that they project high above the belt, the relative projection in respect to an apple $y$ of average size being best illustrated in Figs. 4 and 6.

The arrangement of the brushes, which, in cooperation with the feed belt described, provides runways for the apples, will now be described:

Located above the belt 16 is a transversely vibratory brush-supporting frame of rectangular form, as shown made up of transverse bars 22 and longitudinal bars or members 23, which members 22 and 23 are rigidly connected. There are two of the longitudinal frame members 23 for each runway and, in the arrangement shown, the lower portions of said members are utilized as the brush-supporting backs of laterally spaced brushes 24, the bristles of which project generally in a horizontal direction inward and over the upper surfaces of the respective feed belt 16. The brushes 24 are spaced so that the apples $y$, moving between the same, will be free for some traveling movement, but to provide for variation in the spacing for apples that vary greatly in size, the frame members 23 are made transversely adjustable, this, as shown, being accomplished by the use of nut-equipped bolts 25 passed through said members 23 and through transverse slots 25ª in the transverse bars 22, (see particularly Figs. 1 and 3). Located immediately over the space between each pair of brushes 24 is a long depending brush 26 that is secured to a bar 27, the ends of which are secured to the cross bars 22 of the vibratory frame. As shown, the bars 27, at their ends, are rigidly but adjustably secured to angle brackets 28 by means of slot and bolt connections 28ª, said brackets 28 being rigidly secured to said bars 22. The brushes 26 are thus capable of vertical adjustment to best adapt them for the best action on apples of different sizes. However, with the brushes 24 and 26 in any set adjustment, apples that vary somewhat in size will be properly acted upon. The brushes 24 and 26 are preferably co-extensive and cover the major portions of the underlying feed belts but terminate short of the receiving portions of said feed belts to afford spaced supply hoppers 29 which, as shown, are supported by the posts 10 and are arranged to deliver the apples to the receiving portions of the respective belts. The bottoms of these hoppers are, of course, open so that the belts can pick up the apples with the apples located between the upwardly projecting spacing cleats 20.

The bars 27, which serve as backs for the brushes 26, incidentally constitute part of the vibratory frame. To prevent apples from being bruised if thrown upward from the space between the cooperating brushes 24, (an action which does not ordinarily occur), felt strips 30 are secured to the frame members 23 and these are covered with heavy layers of felt 31, (see particularly Figs. 3 and 4). The transversely vibratory frame, which carries the brushes, is suspended with freedom for transverse vibratory movements, as shown, by flexible hanger straps 32, preferably of spring steel, secured at their upper ends to the beams 15 and attached at their lower ends to the cross beams 22 of said vibratory frame.

The means for driving the feed belts and for transversely vibrating the brush-carrying frame, as shown, comprises as follows: Journaled in suitable brackets 33 on the right-hand posts 9 is a countershaft 34, which, as shown, is driven from a power-driven belt 35 that runs over a pulley 36 on said shaft. At its return end, the shaft 34 is provided with an ordinary worm 37, (shown by dotted lines in Figs. 1 and 2), that engages a worm gear 38 likewise shown in said views, the said worm gear being mounted within a casing 39 secured to the adjacent post 9. The worm gear 38 is secured to a short shaft 40 journaled in the casing 39 and provided at its inner end with a sprocket 41 over which, and a sprocket 42 on the rear roller shaft 18ª, runs a sprocket chain 43.

The countershaft 34 carries eccentrics 44, (see particularly Fig. 4), on which work eccentric straps 45, (see Figs. 1 and 4), that are connected to the outer ends of flexible rods 46, preferably of spring steel. At their inner ends, the rods 46, as shown, by means of nut-equipped bolts 47, are secured to a bar 48 which, in turn, is rigidly but adjustably secured to the cross members 22 of the vibratory frame by slot and bolt connections 49.

The brushes that cooperate with the feed belts to form the runways, in the machine illustrated, terminate short of the delivery portions of said feed belts and, hence, to guide the apples to suitable points for discharge, I have provided channel-shaped discharge hoppers, as shown, made up of parallel hopper-forming members 50 that are secured to an overlying transverse plank or beam 51, which, at its ends, is secured to side plates 52, which, in turn, are rigidly secured to the ends of the frame beams 12.

*Operation*

When the machine is in operation, the feed belts 16 will be slowly moved while the vibratory farme and the brushes carried thereby will be quite rapidly vibrated or reciprocated transversely of the machine, that is, transversely of the line of travel of the apples or fruit through the runways. By the said vibratory action, the opposed horizontally disposed brushes 24 will be thrust alternately against the interposed apples and the apples will be thrust back and forth transversely of the feed belts and will be brushed against the under surfaces of the overlying brushes 26. Engagement with the lower brushes will tend to cause the apples to jump slightly and into contact with the overlying brushes. As the apples are moved forward by the feed belts 16, they will be continuously vibrated and acted upon by the brushes, but all the while will be held spaced and out of contact, the one with the other, so that they will not be bruised or damaged by the cleaning action. Moreover, the apples will be continuously rotated and caused to change their positions in respect to the brushes so that, during the progress through the runways, all surfaces thereof will be thoroughly brushed and cleaned. In fact, during the progressive brushing action, the calyxes of each apple will be several times presented to the endwise thrust of the laterally spaced brushes, thus insuring cleaning of those portions of the apples in which much of the spray dust has accumulated and from which, by ordinary actions, it has been most difficult to remove such deposits. The cleaned apples, as they pass from the brushes, will, by the feed belts, be carried through the discharge hoppers 29ª and may be caught by or delivered into any suitable receptacle, not shown.

It will be noted that the apples, throughout the cleaning action, come into contact only with brush surfaces and with more or less of a rolling action on the padded canvas covering 16ᶜ of the feed belt and, of course, more or less into contact with the soft or pliable spacing cleats 20, and such contacts will not bruise the apples, break the skins, nor in any way injure the surfaces thereof. Occasionally, a very small apple may work its way between the brushes but, even in that event, the apple will not be injured, because it will come into contact only with the brushes and with the pads or pliable coverings 31. An apple out of place, as just stated, will, under the vibratory movement and the action of gravity, soon work its way back to position on the feed belt.

The statements herein made are based on the actual use of the machine involving the invention.

In the modified construction illustrated in Fig. 7, the laterally spaced brushes 24ª are secured to boards or brush backs 23ª which, in turn, are secured to and project upward from a transversely vibratory frame 22ª and which frame carries an upwardly projecting lower brush 26ª. Furthermore, in this arrangement, the feed belt 16′ is arranged to run over the brushes 24ª and 26ª and is provided with depending spacing cleats or lugs 20ª.

In the modified construction illustrated in Fig. 8, vertically spaced opposing brushes 26ᵇ are secured to a frame 22ᵇ that is adapted to be vibrated vertically, and a horizontally disposed brush 24ᵇ is applied to a board or back 23ᵇ, which, in turn, is secured to the upper portion of the frame 22ᵇ. For cooperation with these brushes, a feed belt 16″ cooperates with the brushes 24ᵇ and 26ᵇ to afford the apple runway, and this belt is set to run in a vertical plane and is provided with laterally projecting spacing cleats or lugs 20ᵇ. The operation of the modified constructions illustrated in Figs. 7 and 8 will be obvious from the description of the operation of the more completely illustrated machine shown in Figs. 1 to 6, inclusive.

This application is filed as a continuation in part of my earlier application, S. N. 134,795, filed September 11, 1926, and entitled "Fruit cleaner".

What I claim is:

1. In a fruit-cleaning machine, an endless traveling belt having positively acting projecting fruit-spacing cleats, opposed brushes spaced adjacent to said belt and affording a runway through which the fruit will be passed for cleaning, and means for vibrating said brushes transversely of said runway to produce the cleaning action.

2. The structure defined in claim 1 in which the cleats on said belt are felt strips made in U-shaped form and having outturned edges directly secured to the belt.

3. In a fruit-cleaning machine, an endless feed belt provided with positively acting fruit-spacing cleats, a vibratory frame above said belt, opposed approximately horizontal brushes carried by said vibratory frame and working immediately above said belt, and on the opposite sides of the cleats thereof, and means for vibrating said frame transversely of said belt.

4. In a fruit-cleaning machine, an endless feed belt provided with fruit-spacing cleats, a vibratory frame above said belt, opposed approximately horizontal brushes carried by said vibratory frame and working immediately above said belt and on the opposite sides of the cleats thereof, means for vibrating said frame transversely of said belt, and a depending brush carried by said vibratory frame and overlying but spaced from the spacing cleats of said belt.

5. The structure defined in claim 4 in further combination with padded fillets carried by said vibratory frame and exposed above said horizontal brushes on opposite sides of said depending brush.

6. In a fruit-cleaning machine, the combination with a traveling conveyer, of endwise opposed brushes spaced adjacent to said conveyor, means for vibrating said brushes transversely of said conveyor, and a brush intermediately spaced from an endwise opposed brush and co-operating therewith and with said conveyer to form a channel through which fruit will pass while being cleaned.

7. In a fruit-cleaning machine, the combination with a conveyer belt, of endwise opposed brushes spaced above said conveyer and the third brush intermediately supported above said endwise opposed brushes and co-operating therewith and with said belt to form a fruit runway, and means for vibrating said brushes transversely of said conveyer.

8. In a fruit cleaning machine, brushes having endwise opposed bristles and spaced to afford a runway through which fruit will be passed for cleaning, means for vibrating said opposed brushes in the direction of their bristles and transversely of said runway, and positively acting spacing means arranged to travel in said runway in the direction of the travel of the fruit through said runway and having a plurality of fruit-spacing projections operative to hold the fruit spaced while it is being vibrated and progressively moved through said runway.

In testimony whereof I affix my signature.

HARRY A. INGRAHAM.